March 26, 1963 V. ELVESTROM 3,082,560
DISPLAY DEVICE
Filed Nov. 18, 1959 8 Sheets-Sheet 1
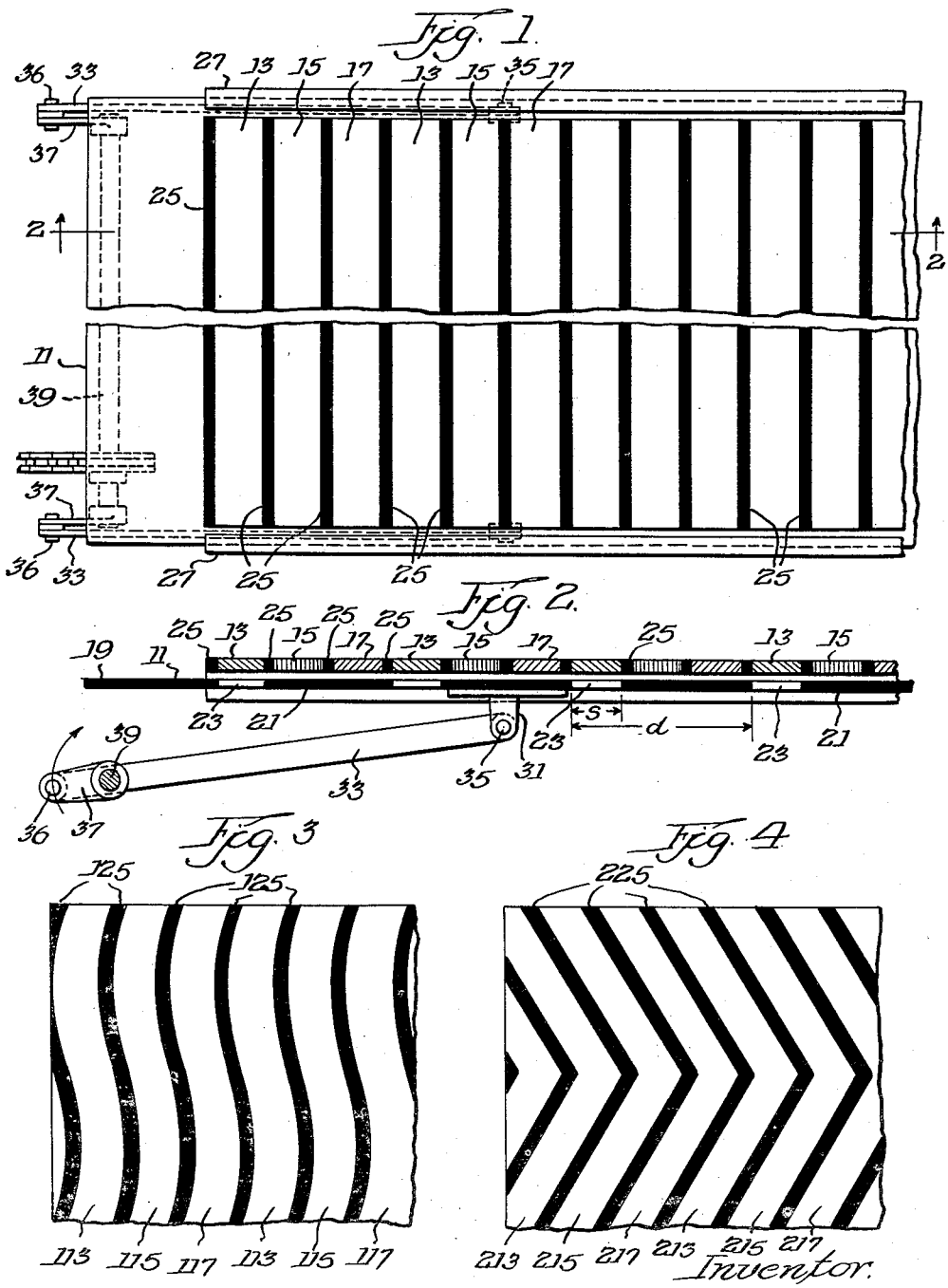

March 26, 1963 V. ELVESTROM 3,082,560
DISPLAY DEVICE
Filed Nov. 18, 1959 8 Sheets-Sheet 2
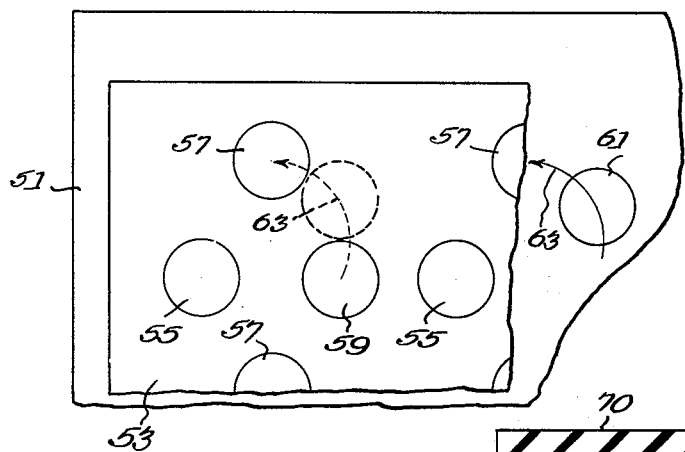
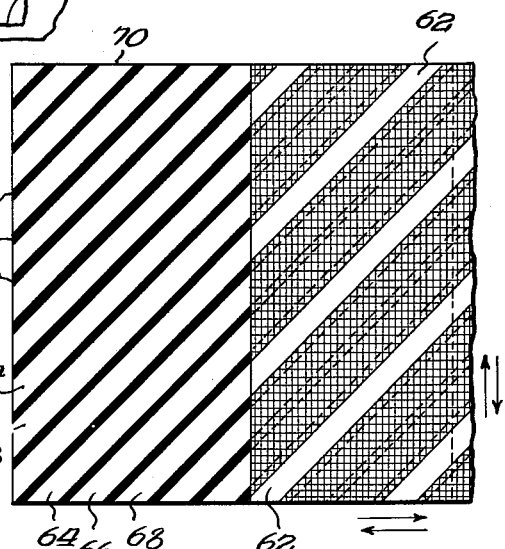
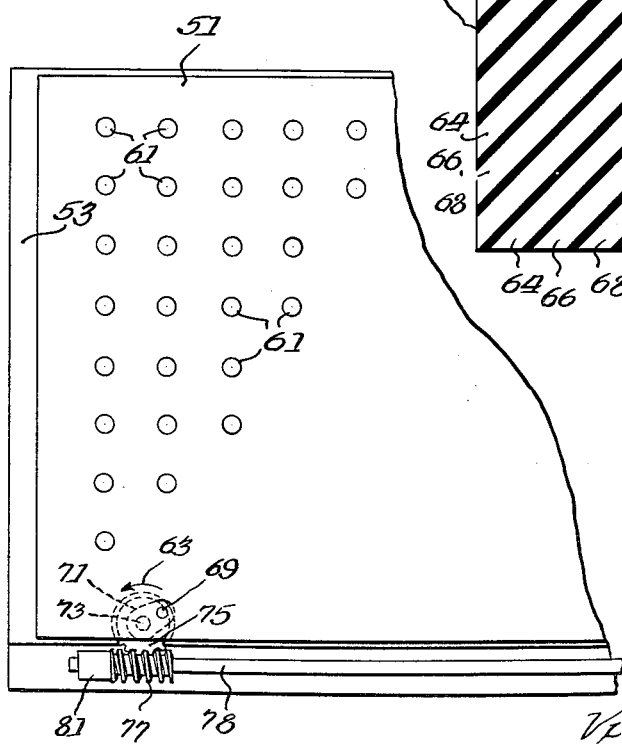
Inventor.
Victor Elvestrom.
By Merriam, Smith, & Marshall.
Attys.

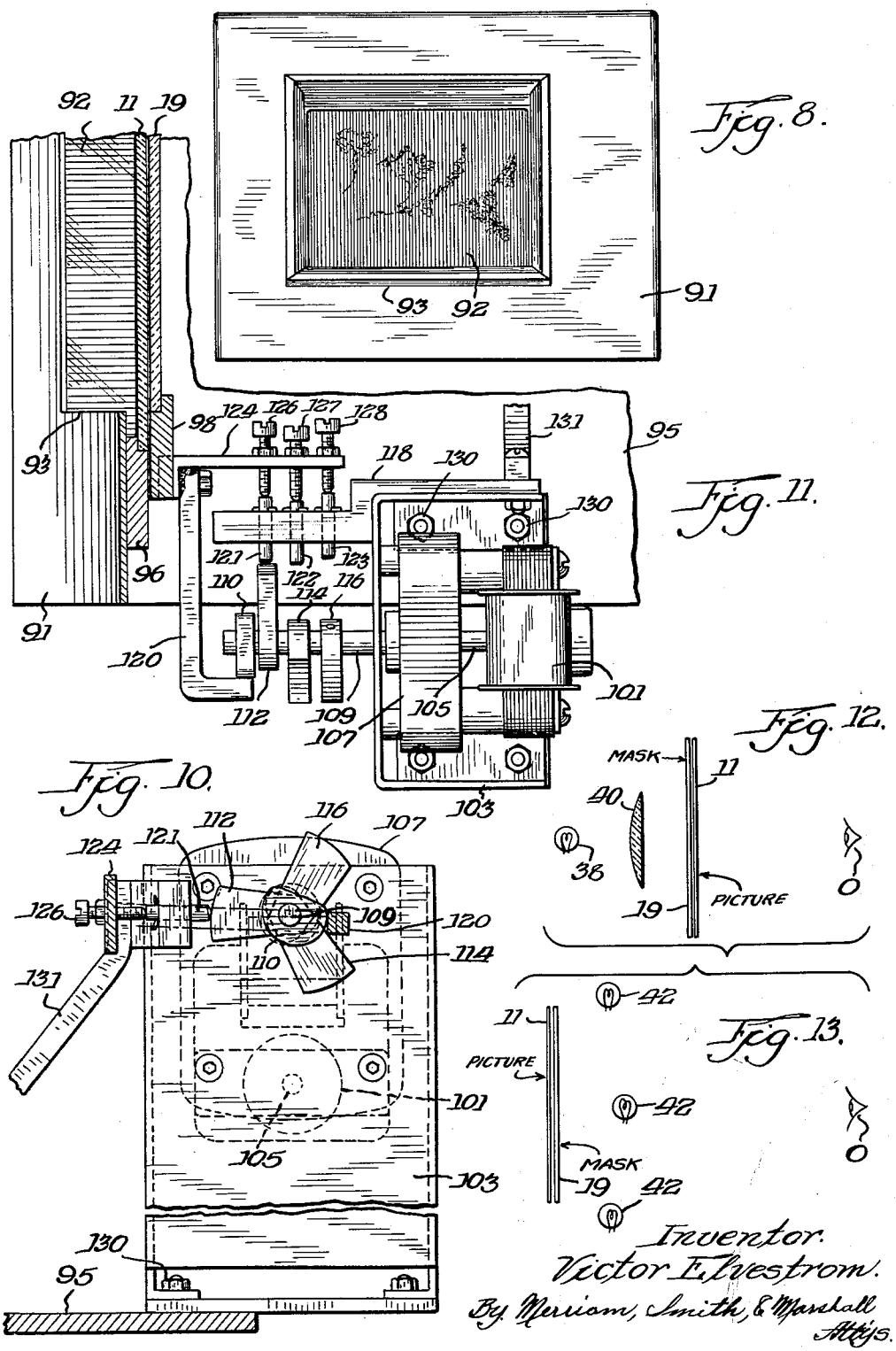

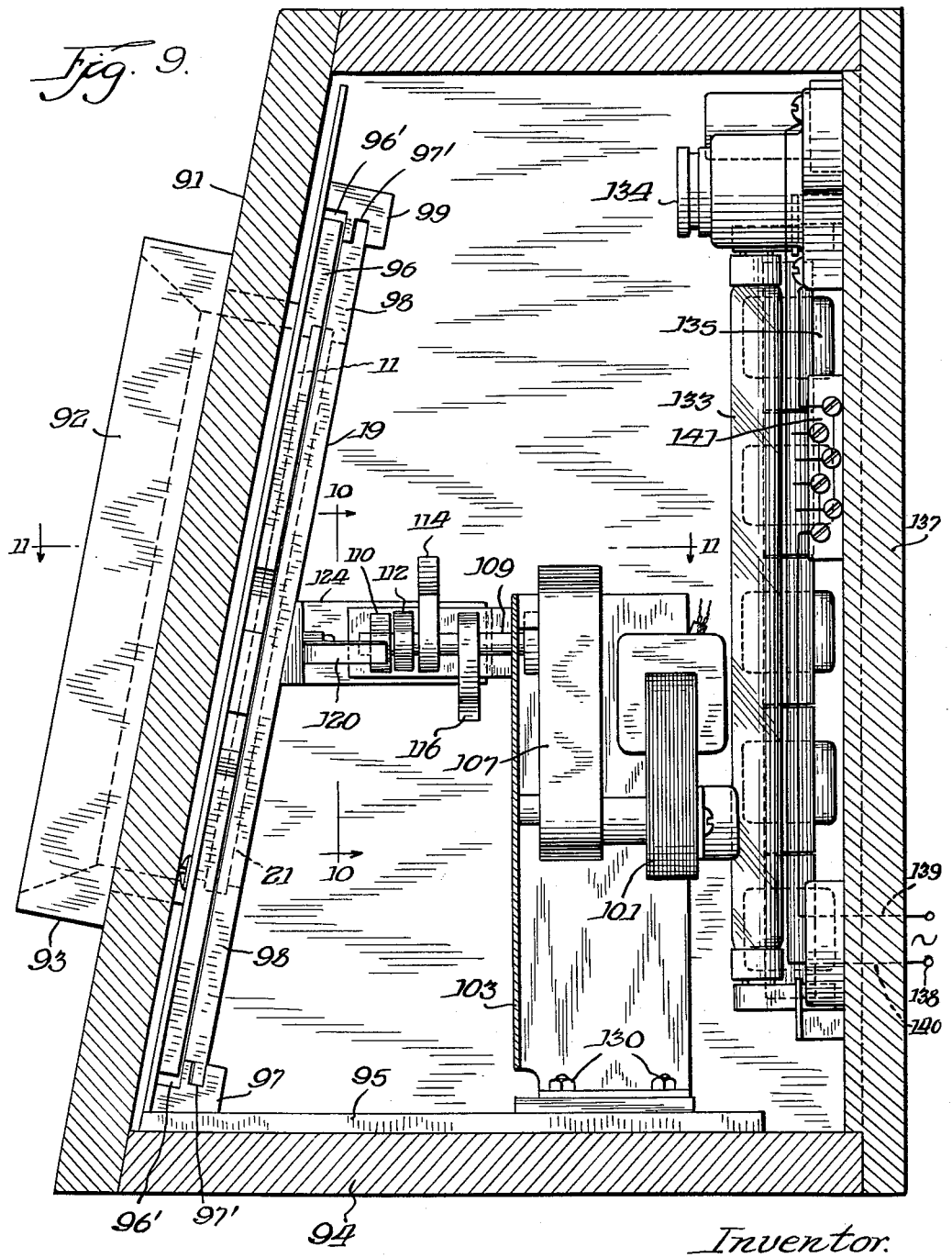

March 26, 1963

V. ELVESTROM 3,082,560

DISPLAY DEVICE

Filed Nov. 18, 1959

Inventor.
Victor Elvestrom
By Merriam, Smith & Marshall.
Attys.

March 26, 1963 V. ELVESTROM 3,082,560
DISPLAY DEVICE

Filed Nov. 18, 1959 8 Sheets-Sheet 6

Inventor:
Victor Elvestrom
By Merriam, Smith & Marshall,
Attys.

March 26, 1963 V. ELVESTROM 3,082,560
DISPLAY DEVICE

Filed Nov. 18, 1959 8 Sheets-Sheet 7

Inventor.
Victor Elvestrom.
By Merriam, Smith, & Marshall.
Attys

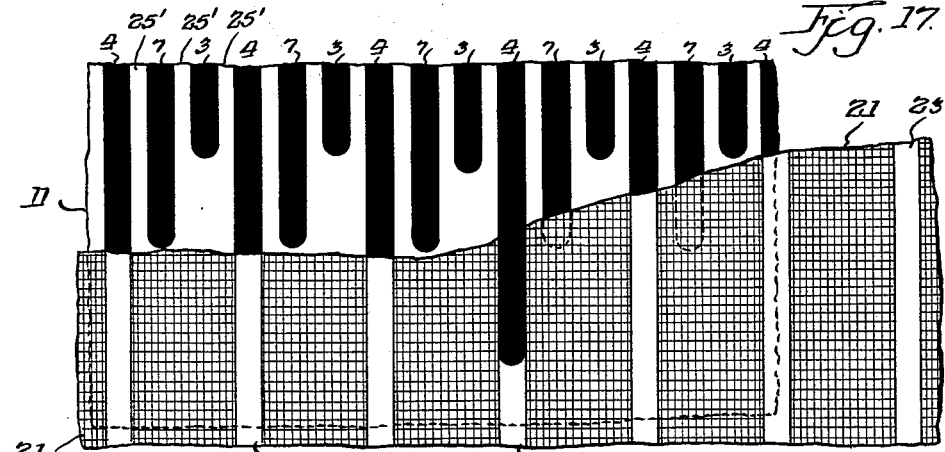
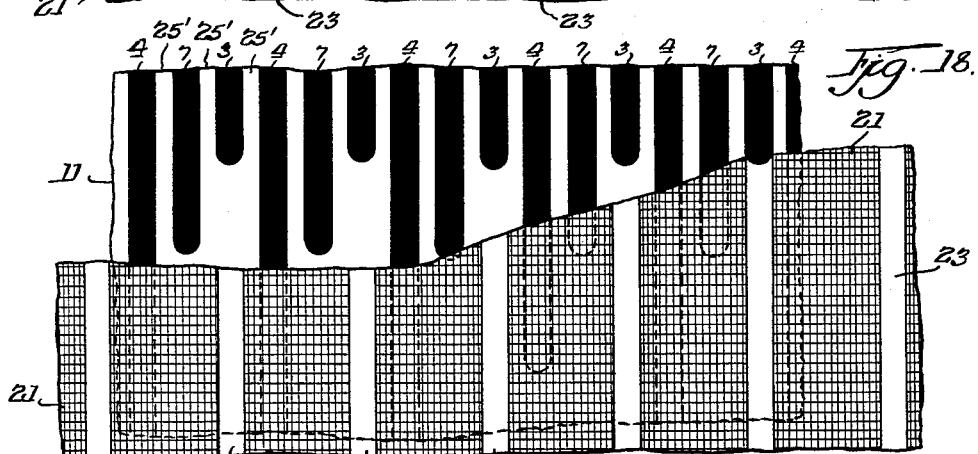
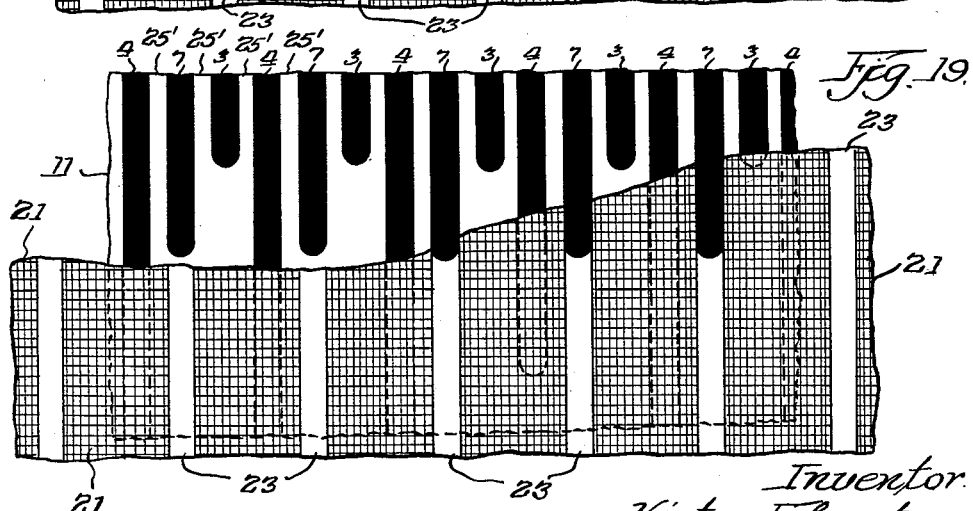

United States Patent Office 3,082,560
Patented Mar. 26, 1963

3,082,560
DISPLAY DEVICE
Victor Elvestrom, Minneapolis, Minn., assignor, by mesne assignments, to Cinestat Advertising Corporation, Madison, Wis., a corporation of Delaware
Filed Nov. 18, 1959, Ser. No. 853,919
24 Claims. (Cl. 40—137)

The invention here to be set forth relates to a display device suitable for individually exhibiting a plurality of separate and distinct pictorial representations for viewing by observers.

Various attempts have been made in the past to provide display arrangements whereby selected different pictorial representations could be individually observed on a viewing panel. Certain of these prior art devices required changes in the position of the observer with respect to the viewing panel so that the individually observable representations became competely dependent upon the viewing angle. Other devices of the prior art have provided for the placement of a mask in such location relative to different pictorial representations that when there is relative movement between the mask and the representation certain areas of the different pictorial representations are viewable but there is no means to prevent overlap of the different images so that they frequently appear to include parts of at least two representations, rather than as components of a single representation appearing to merge fully one with another.

The devices of the prior art, while in some respects serving a useful purpose, nonetheless failed to provide, in the case where the viewing angle determines the representation seen, a possibility of viewing more than a single image from any one particular angle relative to the viewed display panel. This is because the viewing angle is so controlling that one selected image is seen when the observer views the display area from substantially a normal position while a second image is seen when the observer views the display panel from say a selected angle clockwise removed from the normal position, while a third image is seen when the observer views the display panel from a direction angularly removed in a counter-clockwise direction from the normal position. The significant feature is that the position of the observer relative to the display panel becomes the determining factor as to which of a group of representations becomes visible. This fact limits the utility of the apparatus of the prior art and makes it impossible on a single panel to display more than one image unless there is a relative movement between the observer and the display panel itself.

In a second form of the prior art device suggestions have been made for forming a multiplicity of selected pictorial representations into strip-like formations with each pictorial representation having the strips individual to it spaced from each other with the strips of other images located in the intervening regions. Illustratively, if a display panel is to show three distinct images, each of the image representations is formed as a series of strips spaced from each other. The strips of the different images are interspersed or interleaved in a regularly repeating cycle so that, illustratively, the strips repeat in an order a—b—c—a—b—c—a and so on, where a, b, and c each represent different pictorial representations.

Arrangements of the last-described character have the individual strips of each pictorial representation positioned adjacent to one another and the viewer views the different pictorial representations through slots of a masking element which is adapted to be moved transversely of the individual strips. The masking element is of an area substantially corresponding to the combined area of all of the various strips and its apertures or slots are each of a width approximating that of each individual strip of the pictorial representation. The mask slots or apertures are of a length substantially corresponding to the strip length. The number of mask slots or apertures corresponds to the number of strips of the representation and, likewise, the spacing is the same. Where the mask and the pictorial representation are substantially adjacent to each other, the mask apertures may correspond in size and spacing precisely to the individual strips of the different pictorial representations but where the mask and the panel are separated from each other, the strip width and height of the mask apertures is slightly less than that of the strips of the pictorial representations because of light divergence.

Such forms of apparatus, while attempting to provide a picture carrying member of a composite character by the aid of which a plurality of different pictorial representations may be individually and selectably displayed, nonetheless has the disadvantages that the different adjacent strips into which the image is divided for viewing purposes are adjacent and in direct contact with each other. Therefore, barring complicated intermittent motions of the mask and panel relative to each other, it becomes extremely difficult and often impossible to arrest the relative movement of the two components in precisely those positions from which single images only are exhibited for viewing. Consequently, for display purposes it frequently happens that an observer at any one location sees portions of more than a single image simultaneously. The result is that the plurality of viewed image areas appear to merge, with resultant blurring and confusion due to a complete failure to segregate the separate representations one from the other.

The present invention overcomes the defects and difficulties of the prior art arrangements by spacing the incremental areas of each representation from each other slightly from the intervening incremental areas of other representations and including a border region of constant light transmitting or absorbing characteristics around each incremental area to isolate it from the nearest adjacent incremental area. The incremental areas may be of various shapes or configurations, such as of strip formation, or in the form of undulating bands, or in dots, or in a herringbone formation, or in other appropriate forms, provided that each incremental area, irrespective of its particular shape, is isolated from the neighboring and next adjacent area by a region of uniform light transmitting characteristics. In most instances this separating border area is opaque (that is, it neither transmits nor reflects light) but it is also possible to use border areas of high light transmission or any generally constant characteristic, such as a gray, which tends to increase the transmitted light level.

Viewing of the panel, with any desired number of separate pictorial representations, as established by the number of complete sets of like-size incremental areas, is provided by a masking element of approximately the aforesaid character which is arranged and positioned generally adjacent to the panel and (for direct viewing) between the panel and the observer. The masking element has formed therein a multiplicity of apertures of a number corresponding to the number of incremental areas into which each pictorial representation is formed. The individual apertures of the mask are arranged similarly to the individual incremental areas of the panel and are of a size such that they image only the pictorial areas but not the border areas thereabout so that when the mask apertures are superimposed on the panel the incremental areas of a single representation only are revealed to the observer.

The opaque, or constant light transmitting characteristic, border areas surrounding each individual incremental area substantially prevent more than a single image representation becoming observable at any instant. This is because of the fact that even with some lack of preciseness in the relative positioning of the mask to the representation the masking area precludes mask aperture overlap to undesired pictorial representations. Shifting between various pictorial representations is provided by suitable mechanisms for introducing a relative movement between the mask and its apertures and the panel and its incremental areas so that different pictorial areas are revealed through the apertures.

The several pictorial representations of the panel are each divided up into a like multiplicity of incremental areas, each of a chosen pattern. The mask is apertured with apertures of a number and size to correspond to the incremental areas of each picture. The two elements then caused to move relative to each other so that the mask apertures move transversely of the long dimension of the incremental areas of the picture.

One controlling fact with respect to the number of separate pictorial representations which can be selectively and individually viewed is that all of the separated incremental areas of each individual representation when exhibited through the mask must appear as merging to form a complete picture. This is achieved when the separated incremental areas are spaced from each other by an angle of arc less than that which the human eye is capable of resolving, of the selected viewing distance, or at a greater distance. The proposal offers the advantage that various sequences of representation of different images may be achieved. The sequence of revealing individual ones of a series of different pictorial representations 11 may be in one selected order where the motion of the mask is continuous. Where the series of representations is assumed to be equal to four, for instance, the individual and separate incremental areas may be revealed with simple reciprocatory relative motion between the mask and the pictorial representations, so that the representations are exposed in an order $a$—$b$—$c$—$d$—$c$—$b$—$a$—$b$—$c$ and so on. Where the relative motion between the mask and the pictorial representations is reciprocatory but of the so-called "quick-return" type, the separate pictorial representations, with the same assumed number of four different representations, may be in an order $a$—$b$—$c$—$d$—$a$—$b$—$c$—$d$—$a$ and so on (assuming the "quick-return" is so rapid that for all practical purposes images $c$ and $b$ are not observable during the return stroke). It also should be understood from the foregoing that the letters $a$, $b$, $c$, and $d$ are assumed each to designate a separate and distinct pictorial representation.

In view of the foregoing, one of the useful purposes of the invention for instance can be considered as being for various types of advertising. Applied to automobile advertising, the different representations might be separate pictorial showings of each model of car put out by a manufacturer so that a person viewing the display progressively and sequentially views one after another of a series of different models.

On the other hand, the products, or representations, may be completely separate and unrelated one to another and the same display panel thus may in sequence then advertise the products of several manufacturers in much the same way as television programs are sponsored by more than one sponsor.

In the light of the foregoing it becomes one of the primary objects of the invention to provide a display panel for successively and sequentially exhibiting a plurality of pictorial representations with substantial freedom from interference one with the other as they are displayed.

Other objects of the invention are those of providing a display panel for sequentially exhibiting a plurality of pictorial representations where the individual representations may be formed in intermingled relationship and revealed according to a desired pattern or schedule so that the components of individual representations are simultaneously displayed to view while components of the plurality of other pictorial representations are concurrently masked or eclipsed.

Further objects of the invention, of course, are to provide a display device capable of producing and revealing in sequence any selected number of individual representations which will function as advertising and display medium and which will be substantially foolproof in its operation, relatively inexpensive to install, capable of being modified to exhibit different representations by replacing the panel or an image strip covering it, and to produce a device which overcomes prior art defects, usually resulting in interferences produced between the selected image exposures.

Still other objects and advantages of the invention will become apparent from a reading of the following description and claims in connection with the accompanying drawings wherein:

FIG. 1 is a view partially broken away, both as to height and width, of display mask and panel assembly viewed from the rear to show a multiplicity of different images formed on the panel from separated incremental areas spaced one from another by a contrasting border region of constant light transmitting characteristics. In this figure, as in FIG. 2, it will be assumed that viewing occurs through the mask with illumination of the panel provided from the rear, although the device is workable when illumination of the subject is through the mask apertures and viewing is from the panel side;

FIG. 2 is a sectional view taken on the line 2—2 of FIG. 1 showing schematically a mechanism to provide relative movement between a masking element and the display panel, the viewing direction being assumed to be through the mask with illumination from behind the pictorial panel;

FIG. 3 is a modification of the representative panel form of FIG. 1 with the incremental areas each being of undulatory shape usable with a mask form of similar shape adapted to be moved in a path transverse to the areas;

FIG. 4 is a still further modification showing the incremental areas, as well as the apertures of the masking element, arranged in more or less herringbone fashion;

FIG. 5 is a schematic view to represent the incremental areas each being of substantially dot formation with the masking element apertures being of similar shape and arranged for rotary motion relative to the panel bearing the pictorial representations, the drive mechanism not being here shown;

FIG. 6 is a schematic showing of the relative positioning of the panel and masking arrangements of FIG. 5 with respect to each other with one of the elements provided with a drive mechanism for imparting relative rotary motion of one with respect to the other;

FIG. 7 is a view to show the panel having the incremental areas arranged in strips extending in a direction substantially 45° relative to the viewing region of the panel and having similarly positioned masking regions with the masking arrangement and panel being adapted to being moved relative to each other in reciprocating fashion in either a substantially horizontal or a substantially vertical plane;

FIG. 8 is a schematic illustration of the front view of a display cabinet used to display images formed from the schematically illustrated components depicted by any of FIGS. 1 through 7, and that described by FIGS. 9, 10, and 11.

Figure 14:
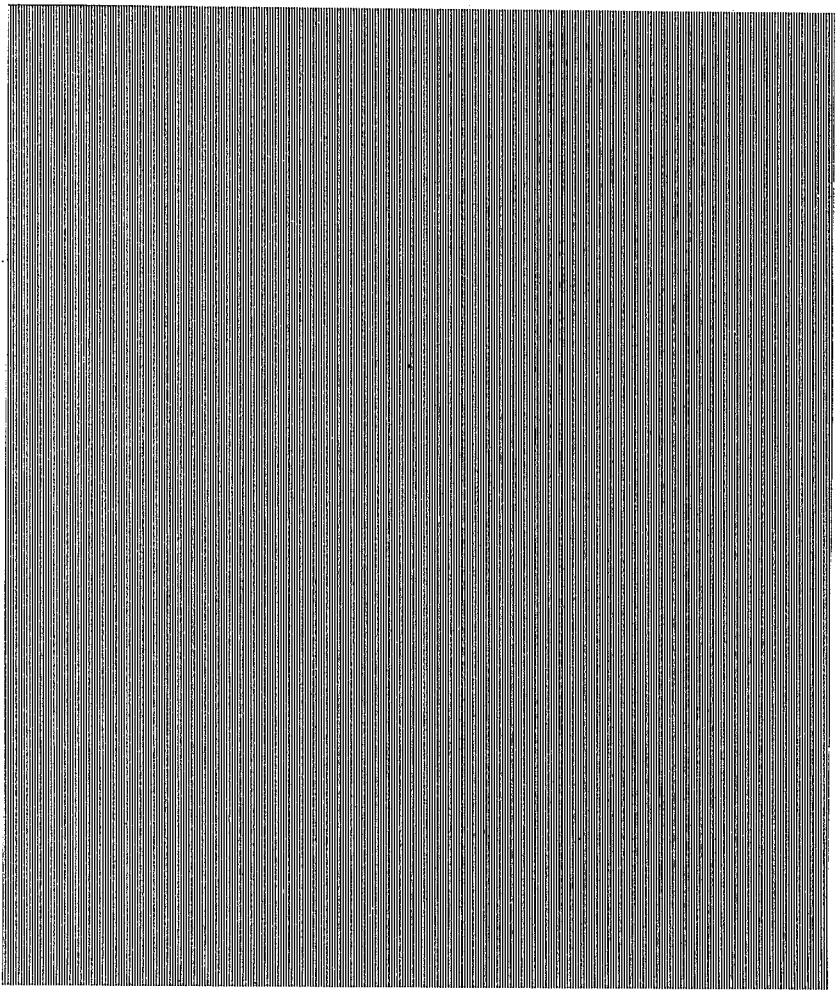
Figure 15:
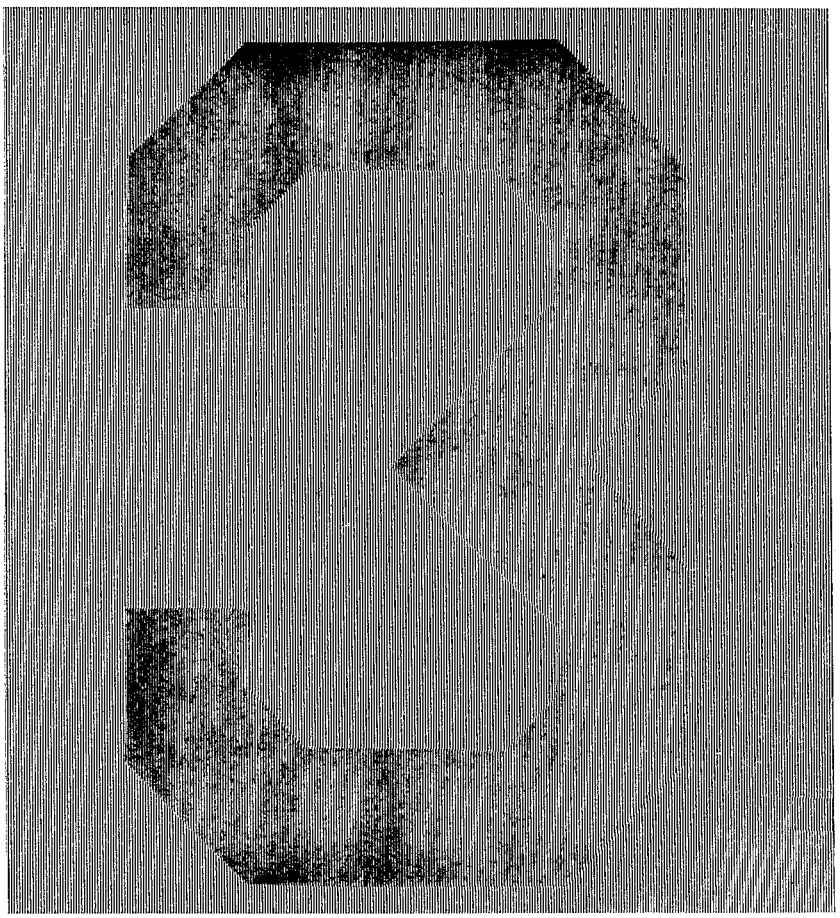
Figure 16:
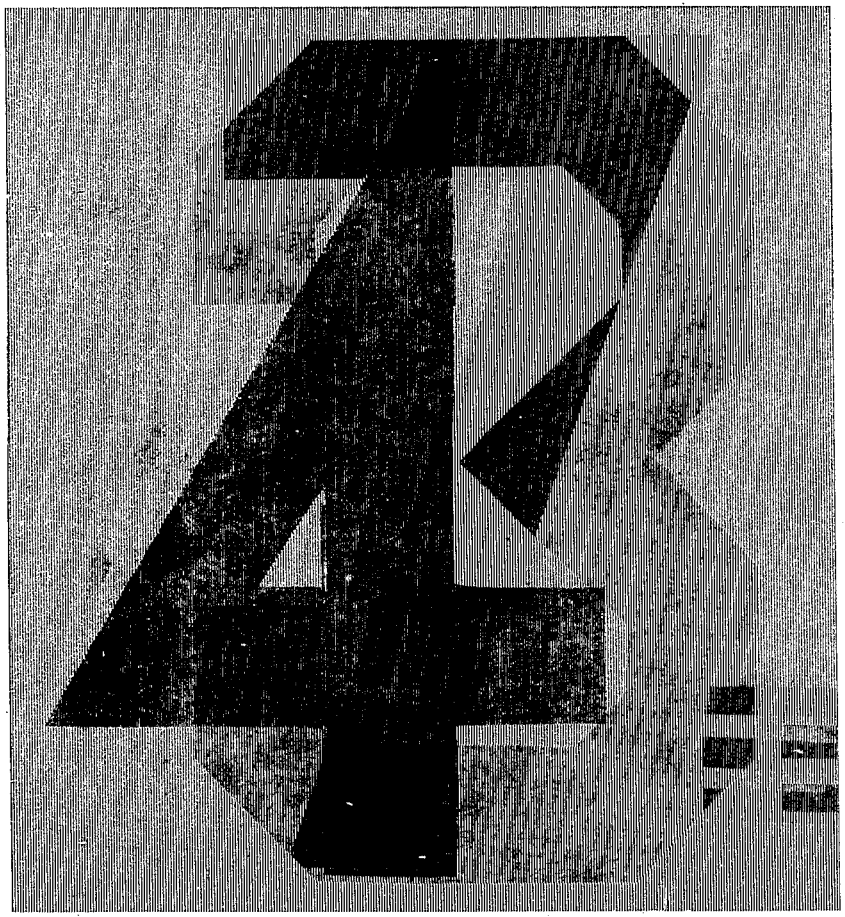

FIG. 9 is a sectional view in side elevation showing the general cabinet arrangement of FIG. 8 together with drive mechanism for reciprocating the mask and pictorial representations with respect to each other and for illuminating the same;

FIG. 10 is a view, partly in section, taken along the line 10—10 of FIG. 9 for the purpose of showing the arrangement of the drive means with respect to the reciprocating means;

FIG. 11 is a view, partly in section, taken along the line 11—11 of FIG. 9, particularly to show in plan the drive mechanism;

FIG. 12 is a schematic view to illustrate the manner of viewing pictorial representations in the form of transparencies where the illumination is directed through the representation and its associated masking element from the opposite side to that viewed;

FIG. 13 is also a schematic view to illustrate the manner of viewing pictorial representations where the illumination and viewing direction are on the same side and the relative position of the masking element and panel determine which of several representations is viewable;

FIG. 14 is a view to show a masking element of a character suitable for viewing three separate image representations where the image representations are divided into three strips, each of a width substantially coinciding to the light lines on the mask and separated by strip widths corresponding to the dark lines on the mask with the dark lines being of such width relative to the light lines as to correspond to those indicated by FIG. 2;

FIG. 15 is a representation of dark lines on a background with the dark lines being those to portray the assumed number 3 and to become visible through the mask depicted by FIG. 14;

FIG. 16 is a view, in some respects similar to FIG. 15, but showing three separate image representations of characters assumed to be the numerals 3, 4, and 7, the darkest areas representing regions where the three characters are formed as pictorial strips precisely adjacent to each other, the next darkest regions showing representations where two of the characters are adjacent to each other and separated by an area which would correspond to that allotted to the third figure, and the lightest areas are those corresponding to the separate numeral indications; and FIGS. 17, 18, and 19 are very substantially magnified representations of selected parts of FIG. 16, formed in schematic arrangement with a masking element to portray the manner of exposing different pictorial information when relative movement is provided between a masking element, such as that shown by FIG. 14, to expose different regions of one of a plurality of representations, such as those shown by FIG. 16.

Now referring to the drawings for a further understanding of the invention, the composite display panel 11 shown by FIG. 1 comprises a multiplicity of segregated similarly positioned like-size incremental areas 13, 15, and 17 representing a plurality of distinct pictorial images. The panel 11 has been shown illustratively to include only three separate pictorial images although more (or even two) may be used where desired. Purely for illustrative purposes and in order to provide ready identification of the different sets of incremental areas with respect to each other, those areas of the first pictorial representation designated as 13 in FIG. 1, where shown in the sectional view of FIG. 2, are colored for green. Similarly, the incremental areas of the second pictorial representation designated in FIG. 1 as 15 are represented in FIG. 2 as colored for red. Lastly, with the 3-display proposal used, illustratively, the third image has its separate incremental areas 17 sectioned in FIG. 2 as for brown. It should be understood, however, that the color sectioning of FIG. 2 has no relationship whatsoever to the actual image but is merely used in the drawing for ready identification in order that the type of pictorial representations may be readily and graphically separated one from the other.

The separate representations identified by regions 13, 15, and 17 are of such size and separation with respect to each other that the separated representations of a like image appear as being separated one from the other by an angle of arc, measured from the remote point, which is less than the resolving power of the human eye so that when viewed in such a manner that only incremental areas 13, are revealed to the viewer's eye by the mask apertures (to the exclusion of incremental areas 15 or 17) each physically spaced area appears to the viewer as if merged into the one nearest adjacent and the representation appears as if in all respects complete insofar as the observer can visually determine. Similarly, for viewing the pictorial representations 15 or 17 the incremental areas 15 or 17 appear to the exclusion of incremental areas of the other representations. This manner of viewing, for instance, is somewhat similar to the manner by which television pictures are created and viewed where the pictures are recreated according to presently existing standards as interlaced pictorial fields. Creating the images in television requires that in one field odd lines only of the pictorial representation are reproduced while in the succeeding field the even lines only of the pictorial representation are produced. However, from the standpoint of the observer, each of the separately viewed picture fields appears as if all line traces were created precisely adjacent to one another and in such manner as to merge one with the other.

The individual viewing of the different representations, such as any of 13, 15 or 17, is made possible by the cooperative use of a masking arrangement 19 (see particularly FIG. 2 for a showing of a masking element for use with the panel of FIG. 1) having light opaque portions 21 and light transmitting apertures 23 through which individual incremental areas 13, 15 or 17, in the case of the arrangement of FIG. 1 can be viewed.

Referring further at this time to the form in which the pictorial representations of FIG. 1 is set up, each incremental area is separated from that incremental area adjacent to it by a border region 25 which clearly separates each incremental area from its neighbor. The border regions 25 each have a constant light transmitting characteristic which differs from the pictorial representation itself. In most instances the border regions 25 are formed as opaque separating bands or areas so that light is neither transmitted through these border regions nor yet reflected therefrom. In some instances, however, the masking and separating effect can be achieved where the border regions 25 transmit or reflect light to a high degree. So long as the transmission or reflectance of the border regions 25 is of a constant value throughout each portion and as the light produced is either interrupted or transmitted in accordance with reflectivity or transmission to the borders of each incremental area of each pictorial representation it is possible to isolate the individual areas of the separate representations from the neighboring incremental areas of other pictorial representations for viewing purposes.

The border regions which separate the different incremental areas of the separate representations from one another may be of various chosen widths, the purpose of the divisions being to permit completely isolated and segregated areas to be viewed so that the incremental areas merge with one another in the eye of the observer and the incremental areas combine, as it were, to establish the separate pictorial representations.

It has been found, generally speaking, that the width of the border region 25 (that is the width in the narrow dimension) is approximately one-sixth the width of any strip 13, 15, or 17 itself. However, some reasonable variances in width may be provided and this is particularly true where the panel is to be used as a large advertising display.

With the arrangement of the incremental areas of different pictorial representations as shown by FIG. 1, it will be observed that the different strips repeat in an orderly cycle but that each strip has adjacent to it on each side (disregarding the border regions for the moment) an incremental area of a different pictorial representation. Thus, the cycle of repetition of incremental areas for a display panel displaying three pictorial representations is, as in FIG. 1, the incremental areas 13, 15, 17, 13, 15, 17, 13 and so on. With border regions being designated in this series it will be appreciated that this series of incremental areas and borders would repeat in a cycle 15, 25, 17, 25, 13, 25, 15, 25, 17, 25, 13, 25 and so on.

In the arrangement of FIG. 1, the pictorial display panel 11 is shown supported and located within a pair of guides 27 above and below the mask and panel. One suitable arrangement to provide for substantially displaying incremental areas indicative of only one representation is to reciprocate the masking arrangement 19 relative to the pictorial panel 11 so that the mask apertures 23 reveal individual incremental areas or strips of the individual pictorial representations and the opaque or non-light-transmitting regions 21 of the mask simultaneously mask or eclipse light transmissions or reflectances from undesired pictorial representations.

As the arrangement has been shown, the mask apertures 23 are of a width and length corresponding to those of each of the incremental areas 13, 15, and 17 and the mask non-transmitting regions 21 are each of a width equal (in the case of a three-image display as in FIGS. 1 and 2) to the width of the remaining two incremental areas plus the width of three borders or masking areas 25. This then leaves the mask apertures of a width (assuming the mask is to be placed adjacent to the panel) corresponding to that of the incremental areas. With this arrangement, each triplet (the term "triplet" is meant each combination to produce the selected number of pictorial representations), in the showing of FIG. 1, is equal to the width of three strips, 13, 15, and 17, plus the width of three of the border regions 25 which, as can be seen from the sectional view of FIG. 2, is represented by the distance $d$, while the strip width of any one of the strips is represented by the distance $s$.

With the pictorial panel 11 and the masking arrangement 19 positioned adjacent to each other and being supported relative to each other by the guide slots of the guide element 27, relative motion between the mask and the panel may be achieved, illustratively, by securing to an edge of the mask at a point external to the viewing field a support bracket 31 to which a connecting rod 33 is pivotally secured at 35. The opposite end of the connecting rod 33 is connected to pin 36 secured to the free end of the crank arm 37, secured, in turn, to the crank shaft 39.

The crank shaft 39 is rotated by any suitable means (not shown in detail) so that reciprocatory motion may be supplied to the mask arrangement 19 by moving it back and forth relative to the panel 11 through the guides 27.

Border regions 25 provided between each of the incremental areas 13, 15, and 17 serve various useful functions but among their most important features are those of substantially precluding interference in viewing by the different separate representations. They make possible the moving readily the mask apertures over the individual incremental areas of the separate pictures without, for the most part, overlapping separate incremental areas of different pictorial representations. They also provide that when the mask is moved relative to the pictorial representations and the mask apertures move so that one edge is carried toward a different incremental area the proportion of the area revealed by the mask is small compared to the portion of the previous area revealed by the larger portion of the aperture. Thus, little or no light passes through the aperture during the first position of its uncovering of a new incremental area as compared to the amount of light revealed by a previously uncovered incremental area which is in the course of being eclipsed. This, then, makes possible sharper viewing of the different regions so that the separate pictures are readily recognized.

In the form in which the mask and panel are moved relative to each other, as depicted by FIGS. 1 and 2 in particular, the motion of the mask is of the reciprocating variety so that the revealed incremental areas are, illustratively, in accordance with the cycle 13, 15, 17, 15, 13, 15, 17 and so on, it being evident that the "dwell" time on each of the incremental areas may be different (if desired) and the time is dependent upon the type of drive mechanism used. However, it can be appreciated that the mask may be formed as a strip moving in a loop both in front of and behind the pictorial panel so that the incremental areas can be revealed in a repeating order in cycle corresponding to representations 13, 15, 17, 13 and so on.

With type of exposure shown, the images and separate pictorial representations on panel 11 can be illuminated either by light from behind the panel, as shown diagrammatically by FIG. 12, so that the light shines through the panel and the mask apertures to be revealed to the observer in accordance with the intensity of light and shade (and, of course, with proper chrominance values in the event that color representations are being viewed), or the illumination of the panel may be from the same side as that along which the observer views the representation, as diagrammatically shown by FIG. 13, so that light is directed to the panel through the mask apertures and the reflected light from the panel seen by the observer is then viewed as reflectances from the panel which become observable through the mask apertures.

The drawing of FIGS. 1 and 2, for convenience, has not shown the precise manner of supporting the panel or the mask in any appropriate housing but as shown by FIGS. 8 through 11 in particular (later to be discussed) the housing or cabinet, or other form of structure used to support the arrangement, may be provided with a viewing window of a size and shape approximately coinciding with the pictorial area of the panel 11 and the mask then be caused to move relative to this component. Where the illumination from the panel is from the rear side, as by lamps 38 directing its light through a field lens 40, so that the panel 11 is generally in the form of a transparency, such as film, the housing structure must be made large enough to house the illuminating structure behind the panel itself. Sufficient space is provided and the light issuing is appropriately diffused by the field lens that generally uniform light intensity is produced on the rear side of the panel, in order that the viewed images shall be precise representations without undesired shadows of the portrayed information. Where reflectances are depended upon for pictorial representation viewing, the illumination may be provided from the edge regions of the housing by a multiplicity of lamps 42 arranged about the outer edges of the housing in such a manner that the illuminated means are appropriately masked from direct view of the observer by the cabinet provided, the panel and mask areas are illuminated substantially uniformly in exhibiting the complete pictorial representations.

In this discussion, it is not intended that the precise manner of panel formation shall be of any specific form but for purposes of illustration one convenient manner of forming the panel is to expose a photographically sensitive film through a mask arrangement of the character shown, for instance, by FIG. 14. In so doing, the mask is held in any desired position with respect to the film which will form the panel 11 and the first exposure is made. The mask then is moved laterally of the film which will form the panel 11 with the mask apertures moved a distance equal to the width of, one of the incremental areas represented by any one of the strips 13, 15, or 17 plus the width allowed for one of the masking or border regions 25. Following such motion of the mask, a second exposure of the film strip which will form the panel 11 is then made. This second exposure then provides individual pictorial representations formed into incremental areas of a second of the images. Following this second image production, the mask again is moved the width of one of the strips 13, 15 or 17 (the motion continuing in the same direction as first provided) in addition to the width of the border region and the third exposure is made. When this film is then developed, the separate image representations appear in regions corresponding to those depicted to those in 13, 15 and 17 with unexposed regions representing the border areas. Development of the so-exposed film will then provide one form of panel which can be exposed. The exposures may result in either black and white or colored pictorial representations.

If it is desired that the border regions between different strips or incremental areas or separate pictorial representations shall be bright strips, as contrasted with dark strips, a masking strip having aperture of a width and length corresponding to the border areas 25 may be used in conjunction with the masking strip 19 and appropriately form bright areas in regions corresponding to those shown in the drawings of FIG. 1 (and other figures) as the dark strips 25.

In other forms of the preparation of panel, and particularly for large size displays, complete pictorial representations may be formed and these may be carefully cut into strips which can be pasted to the panel in a fashion similar to that shown on FIG. 1 with the separate pictorial representations then either manually or automatically assembled. Various other methods of forming the display panel can be resorted to within the teachings of this discourse.

The modifications of FIGS. 3 and 4 represent other configurations of the mask and panel regions providing the different incremental areas. In FIG. 3 the formation is in the form of an undulatory or wave-like series of strips 113, 115, 117, for the different pictorial representations. In this modification the border regions are depicted at 125. It will be appreciated that the apertures of the mask used in conjunction with this panel arrangement have a shape conforming to any of the incremental areas 113, 115 or 117. Where the panel and mask elements are used adjacent to each other, the mask apertures will be of a size corresponding to any of the incremental areas, such as 113. Where separation occurs between the mask and the panel the size differences will be proportional to the separation and the viewing angle. In either instance, the mask and panel members for exhibiting the separate representations are moved relative to each other generally in accordance to the teachings of FIG. 1, as already explained.

In FIG. 4, the separate incremental regions are designated as 213, 215, and 217, respectively, with the masking regions here shown at 225. The arrangement is such that the incremental areas having herringbone configurations merely present certain variances in design and formation.

In many instances, it is desirable from the standpoint of printing and the like to form the incremental areas in generally circular shape, in which event the mask aperture is caused to move in generally orbital path successively to reveal all pictorial incremental areas of each picture while masking other picture representations. The arrangements of FIGS. 5 and 6 depict this type of structure. In each of these figures, the masking element is represented generally by the component 51. In FIG. 5 the masking element is viewed in broken away form and to the rear of the pictorial panel which is represented at 53. The separate representations are divided so that the incremental areas are in the form of dots or circular areas, those areas designated at 55, for instance, being related to one of the pictorial representations, those areas designated 57 being identified with a second pictorial representation, and lastly, those areas designated 59 being associated with the third pictorial representation, assuming three areas are to be produced.

In this arrangement, the incremental areas 55, 57 and 59 are generally located with a respect to each other so that their centers each lie on the circumference of a circle of a radius appropriately chosen so that an aperture 61 of the mask arrangement 51 can be caused to reveal the areas to observational view in sequence. In the case of three pictorial representations represented as incremental areas formed as dots or as circular areas, the centers of the circular areas 55, 57 and 59 are each spaced 120° from each other. Where four separate areas would be revealed, the centers would be spaced 90° from each other; likewise, for a case where five separate areas are to be reviewed to form five separate pictorial representations, the incremental areas have their centers arranged at angular separations of 72° all on a common circumference. In the schematic showing of FIG. 5, the arrow designated as 63 indicates the orbital path which the apertures 61 in the mask 51 may follow to reveal the different incremental areas 55, 57 and 59 in sequence, the actual sequence in exposure in the arrangement shown by FIG. 5 being in the order 55, 59, 57, 55, 59 and so on.

Referring now to FIG. 6, representation has been made of the relative positioning of the mask 51 and the panel 53. In this form, the two components are held from the sides and above in suitable guide members (not shown). The panel may be assumed in this instance to be stationarily positioned with the mask 51 arranged to be moved relative thereto. One convenient form of arrangement to effect orbital or circular movement of the apertures 61 with respect to the incremental areas 55, 59 and 57 has the mask secured at two or more places to a pin 69 extending outwardly from the ends of crank arms 71 secured to crank shaft 73. The crank shafts are appropriately journalled at their ends in bearings (not shown). The shafts 73 also support the pinions 75 which are caused to mesh with the worm gears 77 secured to a drive shaft 78. The shaft 78 is journalled in the conventionally represented bearings 81 and is caused to rotate by any appropriate form of drive (not shown) so that, with shaft rotation, the worm gears 77 are caused to turn and to drive the pinions 75. The crank arms 71 then provide the orbital motion of the mask 51. Movement of the mask thus exposes individually the incremental areas or dots representing the individual pictorial images to view through the apertures 61. The panel 53 itself in this instance may be assumed to be non-light-transmitting so that the panel areas between the incremental areas 55, 57 and 59 form the border regions separating the different incremental areas whereby the mask apertures 61 has moved with respect to the incremental areas reveal a single component at any particular time. The separation otherwise is generally, principlewise, like that discussed with respect to FIG. 1 and those figures related thereto. The arrangement of FIGS. 5 and 6 in many instances is particularly desirable because the exposures are such that the sequence is maintained readily without repeating any of the central most portion of the display. The separation of the individual incremental areas 55, 57 or 59, as can be seen particularly from FIG. 6, is always uniform with each of the areas 55 separated from each other area 55 laterally and vertically by a like instance. The other areas are similarly separated.

In connection with the schematic representation of FIG. 7, the invention has been depicted particularly in fashion whereby the mask and panel can be moved relative to each other so that the mask, for instance, can be moved always in a horizontal direction back and forth or so that it can be moved in a vertical direction, if desired, with respect to the panel. This motion is insured where it is possible to arrange the mask apertures 62 and the incremental areas 64, 66 and 68 of the panel 70 each at 45° to the borders of the panel. The strip areas 64, 66 and 68 are all separated by the masking borders 69. The advantages which particularly result from this structure are that relative movement of the mask with respect to the panel, per se, may be either vertical or horizontal. It thus follows that the precise manner of forming the display panel can vary and in accordance with such teachings this disclosure is now specifically directed to one complete assembly by which the desired operation is maintained.

Reference may now be made to one particular working exemplification of the apparatus which is shown particularly in FIGS. 8 through 11. In these figures the general form of the cabinet for exhibiting the different views, when the arrangement is viewed from the front, is represented by FIG. 8. The cabinet structure is preferably in the form of a box, conventionally represented at 91, which has positioned in its front panel a viewing window region 92. Generally speaking, the viewing window 92 is contained within a more or less shadow-box arrangement 93, which forms a projecting wall extending outwardly from the cabinet structure per se. Within the region of the viewing window 92 the various pictorial representations, shown by the designation 11, are made visible when different apertures 23 of the masking element 21 permit exposure of different incremental pictorial areas. As will be observed particularly by FIG. 9 there is positioned within the cabinet structure 91 a suitable illuminating means for producing light which is directed through the masking element 21 and its apertures 23 to expose different incremental areas of the pictorial representation 11 to view.

Considering now in particular the structure shown by each of FIGS. 9, 10, and 11 of the drawings, it will be seen that FIG. 9 represents a sectional view through the assembled cabinet 91 of FIG. 8 shown as if the right side had been removed. In the view there is positioned as a part of the cabinet a base 94 which is adapted to support a sub-base 95. Carried upon the sub-base 95 there is a guide structure 97 supported to guide and position each of the pictorial representations 11 and the masking element 23. Each of these elements is also positioned and held from the upper portion of the cabinet structure by a second frame support 99, which is secured in any appropriate fashion to the front panel of the cabinet 91. The pictorial representations of the general character depicted by FIG. 1, and diagrammatically represented therein by the panel 11 and showing the separate pictorial representations 13, 15, and 17, are held within the inner bracket or recess 96' in such a way as to be fixedly located with respect to the viewing window 92.

The pictorial representation is supported in the arrangement shown by a generally rectangular frame 96 which fits within the recess 96' so as to be fixedly located therein and positioned immediately in front of the window or viewing area 92. Also supported within the recess 97' in the upper and lower brackets 97 and 99 there is a second frame 98 which holds the masking element 21 which is adapted to be moved transversely of the pictorial representations 11, the movement being provided by a suitable mechanism (later to be discussed) for sliding the complete frame 98 within the guide members 97 and 99. In this form of the device the apertures 23 of the masking element 19 progressively uncover individual like-characteristic pictorial representation areas 13, 15 or 17, as was depicted by FIG. 2.

To effect the motion of the masking element 19 and to move its apertures relative to the pictorial representations on the surface 11 (considering illustratively the structure shown by FIGS. 1 and 2) a motor mechanism 101, which is held within the frame-work 103, has been provided. This motor in the frame-work is secured in any appropriate fashion to the cabinet sub-base 95 which supports also the support guide 97. As the motor is adapted to be driven to rotate in well-known fashion, it need not here be explained in further detail.

The motor is so arranged that its rotating shaft 105 connects into a gear box, conventionally represented at 107. Within this gear box 107 there appropriate speed reduction gearing is supported in a way to drive the output shaft 109 which is represented as supported within appropriate bearing members in the frame 103 and within the housing (as depicted) for the gear box arrangement 107. At times of energization of the motor 101 it is apparent that the shaft 109 which is driven as the output of the gear box 107 is adapted to turn (usually at reduced speed) the shaft 109 overhangs the framework 103 supporting the motor and the gear box as a cantilever.

Suitable cam mechanisms 110, 112, 114, and 116 are secured to the overhanging cantilever portion of the shaft 109. These various cams have slightly different configurations measured from the center of the drive shaft 109 out to their outermost periphery so that when turned they are adapted to move adjacently positioned followers to a greater or lesser distance, depending upon the view or pictorial representation to be portrayed.

As can be seen particularly from the showings of FIGS. 9, 10, and 11, the various cams 110, 112, 114, and 116, each carried upon the driven shaft 109, are angularly displaced with respect to each other so that, when measured with respect to any particular point external to the position of rotation of the drive shaft 109, a follower, adapted to contact the cam surface, will be moved to a greater or lesser extent with respect to the axis of rotation of the shaft 109. These peripheries of cams 112, 114, and 116 contact various cam follower pins 121, 122, and 123 which are held on a bracket 118 of the frame. The outer edge of the pins 121, 122, and 123 press against the ends of set-screws or follower pins 126, 127, and 128 which, in turn, are secured to a bracket 124 which is fastened to the frame 98 to which the mask element is secured. The cams 112, 114, and 116 are each angularly displaced with respect to the other and in various angular positions, due to the rotation on the shaft 109 as driven from the gearing arrangement 107 from the motor 101, successively contact the follower pins 121, 122, and 123. Then, in accordance with which of the group of the follower pins is contacted, there will be determined the amount of shift of the mask (looking from the right of the elements in FIGS. 9 and 11) with respect to a normal position. It can be seen, as depicted particularly by FIG. 10, that the cam elements 112, 114, and 116 are, generally speaking, positioned approximately 120° apart from each other so that with rotation the follower pins 121, 122 and 123 which rest against the ends of set-screws 126, 127 and 128 will be moved a greater or lesser distance with respect to a selected normal position.

The cams 112, 114 and 116 are each generally of approximately similar shape and size, although the cam 112 (which may be considered as the center one of a group) is placed so that its follower contacts set-screw 126 to move the frame element in which it is held by a distance with respect to an optimum or equivalent position such that any one strip is moved prior to the exposure of what may be considered as an intermediate area in an amount equal to the width of two pictorial areas plus two constant light transmitting border areas. Similarly, the cam 114 is so set that it will move its follower pin 122 and the adjustable set-screw element 127 a distance sufficient to displace the mask 19 with respect to the picture element by a distance equal to one pictorial strip representation 13, 15 or 17, plus the width of one constant intensity area of an opaque or completely transparent, or an intermediately transparent area 25.

FIG. 11 of the drawings makes clear that the set screw 126 may be regarded as having its outer end located in about a mid-position relative to set screws 127 and 128 in the bracket 124, while set screw 127 is located so that its outer end extends closer to the axis of shaft 109 holding the cams than does the set screw 126. Similarly, set screw 128 is set so that its outer end is further removed from the axis of the shaft 109 and the cams than either of set screws 126 or 127. Under the circumstances it becomes apparent that if the cams 112, 114, and 116 all have similarly shaped outer cam faces and all are similarly mounted on the shaft 109, greatest motion of the bracket 124 will be provided when cam 114 contacts its follower pin 122 and then moves the bracket 124 through set screw 127 to the greatest distance from the axis of shaft 109. The least motion of the bracket arm occurs when cam 116 abuts the outer end of the follower pin 123 to move the set screw 128 and the supporting bracket arm 124. Consequently, considering a situation where the mask 19 has been returned to an initial position, the first step of movement of the mask and its apertures relative to the pictorial representation 11 is provided by the cam 116 contacting its follower pin 123. Next, the cam 112 contacts the follower pin 121 and through it set screw 126 to move the bracket arm 124 still further away from shaft 109. Lastly, cam 114 contacts its follower pin 122 and through it moves the set screw 127 and the bracket arm 124 still further. These stepped movements are made evident from the showing of FIG. 10, assuming the shaft 109 to rotate in a clockwise direction from which the relative positioning of the cams 112, 114, and 116 is clearly observable. Quick-return to the start position is provided when cam 110 contacts the outer end of arm 120 to move the assembly in the opposite direction.

The arm 120 which is carried from the frame 98 turns inwardly at its outer end so as to contact the outermost cam 110 of the series supported on the shaft 109 during a portion of the rotation period thereof. The cam 110 is shaped generally as shown by FIG. 10, and with the inturned arm 120 positioned as indicated, it contacts the arm as its follower through one limited angle of arc during each rotation. At the time this contact occurs, the cams 112, 114 and 116 have all turned through such an angle that there is no instantaneous contact between them and their follower pins 121, 122 and 123, respectively. If the cam 110 is of such shape that in contacting the inturned end of the arm 120 it so moves that arm and its supporting frame 98 to an extent equal to that distance necessary to return the mask 19 from a position such that the apertures have uncovered say the incremental areas 13 to one where the incremental area 17 will be revealed, it can be appreciated that this motion is of the so-called "quick-return" variety. Since the cam 110 is so shaped that when the arm 120 is moved by it the cam immediately is separated from the arm, it is clear that the next cam to contact a follower will be one which moves the mask to such a position that the different incremental areas are successively brought within the mask apertures and continued rotation of the drive shaft progressively moves the mask in step fashion until the cycle is again repeated.

Rotation of the drive mechanism and the driven shaft 109, as driven through the gear box 107, produces exposure of incremental pictorial areas in a selected order of a, b, c, a, b and so on that the representations are successively viewed in a selected order. By reason of the "quick-return" there is only an extremely brief viewing position during the return stroke when the pictorial strip corresponding to the central region between any three strips 13, 15, and 17 can be seen. This is so brief that for all practical purposes it is as if the exposure order (for a three-view display, for instance) were always in one selected order, such as a, b, c, a and so on.

Stability of mounting is established because the frame 103 which supports the motor 101 and its associated gear box 107 is suitably anchored at its lower portion and particularly at its inwardly turned feet by anchoring bolts 130 extending through the sub-base 95. The upper portion of the frame is anchored to the same sub-base by a bracket arm 131, extending, as shown particularly by FIGS. 10 and 11, angularly toward the sub-base.

The pictorial representation 11 contained within the viewing area 93 of the cabinet 91 is illuminated, in the form of apparatus shown by FIGS. 8 through 11, inclusive, by means of rear illumination whereby the illuminating light is directed through the apertures of the mask element 19 to illuminate selected incremental areas of the pictorial representation.

FIG. 12 is a diagrammatic showing of one form of the illuminating means where the conventionally represented light source 38 is adapted to project its light through a field lens 40 and thence through the masking element 19 and the pictorial representation 11, so that selected areas of the pictorial representation 11 come within the field of viewing of an observer, conventionally represented by the letter "O."

In an alternative form, as already intimated, the pictorial representation may be illuminated from the same side as that from which it is viewed. This type of display has been shown in a schematic form by FIG. 13. Referring to FIG. 13 it will be seen that the illuminating sources 42, which may be assumed to be generally uniformly distributed about the periphery of the masking element, as well as the pictorial representation, are arranged to project their issuing light over the area of the masking element. The sources are appropriately arranged with respect to each other so that one does not cast a shadow on the masking element with respect to each other. This then accomplishes the same general plan as does the field lens 40 in FIG. 12 where the light issuing from the source 38 is widely distributed in substantially uniform intensity over the entire region of the mask. Further, the peripheral location of the light sources 42 in the arrangement shown by FIG. 13 is such that the light sources are positioned external to the observer's field of view. The light sources are usually shielded by any appropriate means so that an observer, positioned at the point "O" cannot see them. The light issuing from the sources 42 in the arrangement of FIG. 13 is thus projected toward the mask and with shifting positions of the mask relative to the pictorial representation 11 selected pictorial representations are uncovered by the mask apertures for viewing purposes.

Referring back to the embodiment of the invention as particularly depicted by the view represented by the sectional elevation view of FIG. 9 for one device where direct viewing is provided a plurality of lamps 133, preferably in the form of elongated fluorescent bulbs, having the usual ballast resistors 134 and transformers 135 for excitation, are carried by appropriate mounting brackets on the rear panel 137 of the cabinet. Terminal points 138 are provided for connecting an external source of power to the assembly via a pair of input conductors 139 and 140 leading to a terminal strip 141 to which each starter transformer is connected. In the arrangement shown it has been assumed that five elongated fluorescent bulbs 133 are positioned in uniformly spaced relationship with respect to each other to extend parallel to one another across the rear panel 137 of the cabinet 91. The provision of such fluorescent bulbs is adequate to insure a generally diffused lighting as the lighting reaches the rear of the mask element 19 to be projected through its apertures to illuminate the pictorial representation 11 which is to be viewed. The drive motor and its associated gear box, as well as the control cams, are positioned external to the light paths from the light 133 to the masking element.

Reference may now be made to the exemplifications of the invention shown by FIGS. 14, 15, and 16. In this showing FIG. 14 is a representation of the general form of the masking element 19 as used to control the illumination of the pictorial representation 11 in a cabinet structure of the character depicted by FIG. 9. Bearing in mind that in the discussion of the representations described particularly in connection with FIGS. 1 and 2 different pictorial regions were shown by the numerals 13, 15 and 17 as an illustration, and also bearing in mind that adjacent to each of the incremental portions 13, 15, and 17 a border area of constant light transmitting characteristics has been provided (one form of which border was shown as an opacity as particularly clear from FIG. 2), and still bearing in mind that the apertures 23 of the masking element 19 are of a width corresponding to the width selected for the incremental representation of the complete pictorial image, the light areas of the showing of FIG. 14 are intended to coincide with the region 23 in FIG. 2. The dark regions in FIG. 14 correspond to the non-transmitting regions of the masking element. Thus, it will be observed that the light regions of FIG. 14 correspond to elongated apertures having an assumed width $s$ (as in FIG. 2) and a length corresponding to whatever height it is desired to make the masking element. The width of the dark or opaque areas in the showing of FIG. 14 (as in FIG. 2) is represented by the quantity $(d-s)$, also as clear from what is shown by FIG. 2.

As particularly depicted by FIGS. 1 and 2 areas 13 are each assumed to represent one part of a pictorial representation. The showing of FIG. 15 is intended to be illustrative of one particular pictorial representation which might be assumed to be that of the incremental pictorial strips 13 where the pictorial representation of FIG. 15 is shown as the numeral 3. The dark strips forming the numeral 3 are each shown as being of a width corresponding to the width depicted by the numerical representation 13, plus the width of each of the masking areas 25 adjacent thereto. The width of the extremely fine line on FIG. 15 which is midway between heavier dark lines of the outline numeral 3 corresponds to the width of the border area which is shown particularly on FIGS. 1 and 2 as the border region 25 between the incremental pictorial strips 15 and 17. Thus, the outlined character representing the numeral 3 in FIG. 15 is a dark area covering each part of the strip 13, for instance, of FIG. 15 where the numeral 3 would appear, but is a light strip in every other region. In all instances, however, the showing of FIG. 15 is such that there are light areas separated by dark constant light transmitting regions corresponding to regions 25 of FIGS. 1 and 5, for instance, so that any pictorial representations appearing within the space between these dark regions may depict one or another character. If the paper on which the mask of FIG. 14 is printed were transparent in each region corresponding to a light area of FIG. 14 it would be seen that the mask of FIG. 14 could be super-imposed upon the character 3 of FIG. 15 in such a way that the dark regions of the numeral 3 would be observable through the mask and, consequently, if the mask were illuminated and placed between the illuminating source and the observer, the particular character 3 would be apparent in the mask apertures.

The diagrammatic showing of FIG. 16 is in many respects similar to that of FIG. 15 except that in FIG. 16 three separate characters are shown and it will be apparent that the numeral 3 of FIG. 15 is present there in addition to the numerals 4 and 7. In this showing it may be assumed that the number 4 occupies a position which would correspond to that position in which it would appear in each of the incremental areas 15 of FIG. 1. Likewise, the numeral 7 may be assumed to appear in each of the regions marked 17 in FIG. 1. Consequently, following the plan depicted by FIG. 15, it will be appreciated that where portions of the characters 3, 4, and 7 are adjacent to each other, the overall picture representation of 16 will appear as solid black. Were only two of the characters adjacent to each other, it might be assumed, for instance, that the areas 13 and 15 (as in FIGS. 1 and 2) would be solid black and with them the border regions 25 to the left of strip 13, 25 between strips 13 and 15, and strip 25 to the right of strip 15, but the area represented at 17 would be a transparency. If, in the representations of FIG. 16, only one of the three assumed characters is present it would, of course, appear as explained in connection with the diagram of FIG. 15. It thus becomes apparent that the apertures of the masking element can be positioned with respect to each of a plurality of three pictorial representations arranged as in FIG. 16, so that only a single representation is at any time revealed.

The showing of FIGS. 17, 18 and 19 are intended schematically to represent the described situation with the exception of the fact that the dark areas of each of the assumed numerals 3, 4, and 7 are represented in a most schematic form in these figures and that these areas are separated one from the other by the regions 25' (for convenience shown greatly enlarged with respect to the regions 25 which they are intended to stimulate) and which are shown in FIGS. 17, 18, and 19 as transparencies rather than as opacities, as shown by FIGS. 1 and 2 in particular. It was considered that the showing of the transparent portions, which would be also effective as a border region because of the constant light transmitting value (of course, raising the light level of the overall representation in the event that there was not precise registry between the mask apertures and the incremental strips) would depict and provide a clearer showing than might the dark strips. In this way the dark strip areas 4, 7, and 3 may be assumed to represent a selected cross-section through a part of the showing of FIG. 16, with the dark lines separating the pictorial strips of FIG. 16 being replaced in FIGS. 17, 18 and 19 by transparent areas. The difference between FIGS. 17, 18 and 19 is that the mask apertures 23 of these three figures have been positioned to reveal different pictorial strips. For instance, all of the dark regions marked by the numeral 4 to represent the character 4 of FIG. 16 are revealed by the mask apertures 23 in FIG. 17. In FIG. 18 the mask 21 has been shifted laterally with respect to the pictorial representation 11 so that the mask apertures now uncover each incremental strip area intended to designate a part of the numeral 3, this being the numerals assumed to be represented by FIG. 15 and a part of FIG. 16. Lastly, the showing of FIG. 19 is one where the mask 21 has been moved with respect to the pictorial representation 11 in such a fashion that the mask apertures 23 now reveal parts of the numeral 7, assumed as part of representation of FIG. 16. From the showing of FIGS. 17, 18, and 19 it can readily be appreciated that if the positioning of the mask apertures 23 is not sufficiently precise to place one of the incremental areas 4, 7, and 3 exactly within those boundaries, that overlap which can be fairly substantial is possible without revealing a non-desired characteristic, and that the overlap will, in the case of the transparency 25', merely pass constant intensity light along with such portion of one of the characters 4, 7, or 3 as happens to be within the mask apertures. The constant intensity light will raise the light value slightly of the overall observed image and will, of course, reduce to some extent the contrast therein, but it will still leave discernible, and clearly so, the character outline. If the area as designated as 25' in each of FIGS. 17, 18, and 19 should be opaque and there should be no precise registry between the mask aperture 23 and the particular pictorial strip regions 4, 7 or 3, the pictorial representation could still be viewed, but the overall light level would be reduced.

The displacement of the masking region 21 of each of FIGS. 17, 18, or 19 with respect to the pictorial representation 11, of course, will be understood to correspond to that displacement which is provided by the mechanism depicted in all of FIGS. 8 through 11, or schematically represented by FIGS. 1 and 2.

Various modifications, of course, may be restored to as desired, and particularly various other modifications may be resorted to for the obtainment of the relative motion between the masking region and the pictorial region where the border areas are other than straight, and these, of course, will also be apparent from what has been hereinabove stated.

This application constitutes a continuation-in-part of my presently copending application, Serial No. 681,252, filed August 30, 1957, now abandoned for an invention also entitled "Display Device."

Having now described the invention, what is claimed is:

1. A composite display panel to form a plurality of pictorial representations comprising a multiplicity of sets of segregated similarly positioned like-size incremental areas of the plurality of said representations, the incremental areas of each representation being spaced from each other by orderly repeating intervening and interspersed incremental areas of other representations, and a border region of a uniform light transmitting characteristic different from the pictorial representations around each incremental area to isolate it from the nearest adjacent incremental area, each incremental area of each separate pictorial representation being spaced from the nearest adjacent incremental area by an angle of arc measured from a remote viewing point which is less than the resolving power of the human eye.

2. In combination, a composite display panel providing a plurality of pictorial representations and comprising a multiplicity of sets of segregated similarly positioned like-size incremental areas of the plurality of said representations, the incremental areas of each representation being spaced from each other by orderly repeating intervening and interspersed incremental areas of other representations, and a border region of a uniform light transmitting characteristic different from the pictorial representations around each incremental area to isolate it from the nearest adjacent incremental area, each incremental area of each separate pictorial representation being spaced from the nearest adjacent incremental area by an angle of arc measured from a remote viewing point which is less than the resolving power of the human eye, and a mask adapted for positioning between the panel and the point of observation, said mask having therein a multiplicity of apertures of a number and shape substantially corresponding to the number of incremental areas into which each pictorial representation is formed, the mask apertures being positioned similarly to the segregated incremental areas of the representation so that when superimposed on the panel the apertures are imaged upon the spaced incremental areas of a single representation only, with all incremental areas of other pictorial representations on the panel masked.

3. In combination, a composite display panel providing a plurality of pictorial representations and comprising a multiplicity of sets of segregated similarly positioned like-size incremental areas of the plurality of said representations, the incremental areas of each representation being spaced from each other by orderly repeating intervening and interspersed incremental areas of other representations, and a border region of a uniform light transmitting characteristic different from the pictorial representations around each incremental area to isolate it from the nearest adjacent incremental area, each incremental area of each separate pictorial representation being spaced from the nearest adjacent incremental area by an angle of arc measured from a remote viewing point which is less than the resolving power of the human eye, and a mask adapted for positioning between the panel and the point of observation, said mask having therein a multiplicity of apertures of a number and shape substantially corresponding to the number of incremental areas into which each pictorial representation is formed, the mask apertures being positioned similarly to the segregated incremental areas of the representation so that when superimposed on the panel the apertures are imaged upon the spaced incremental areas of a single representation only, with all incremental areas of other pictorial representations on the panel masked, and means to shift the relative position of the panel and mask with respect to each other to reveal, with shift, different ones of the multiplicities of incremental areas related to selected different pictorial representation.

4. A composite display panel to form a plurality of pictorial representations comprising a multiplicity of sets of segregated similarly positioned like-size incremental areas each representation being identified by a different set of incremental areas which are spaced from each other by orderly repeating intervening incremental areas of other representations, and a light absorbing border region around each incremental area to isolate it from the nearest adjacent incremental area, each incremental area of each separate pictorial representation being spaced from the nearest adjacent incremental area of the said representation by an angle of arc measured from a remote viewing point which is less than the resolving power of the human eye.

5. A composite display panel to form a plurality of separate pictorial representations each comprising a multiplicity of sets of segregated and similarly positioned like-size incremental areas of the plurality of representations, the incremental areas of each representation being spaced from each other by orderly repeating intervening incremental areas of other representations, and an opaque border region around each incremental area to segregate it from a similarly positioned incremental area of a different representation and to isolate it from the nearest adjacent incremental area of the same representation, each incremental area of each separate pictorial representation being spaced by the border and incremental areas of different representations from the nearest adjacent incremental area of the same representation by an angle of arc measured from a remote viewing point which is less than the resolving power of the human eye.

6. In combination, a composite display panel having a plurality of separate pictorial representations each comprising a multiplicity of sets of segregated and similarly positioned like-size incremental areas of the plurality of representations, the incremental areas of each representation being spaced from each other by orderly repeating intervening incremental areas of other representations, and an opaque border region around each incremental area to segregate it from a similarly positioned incremental area of a different representation and to isolate it from the nearest adjacent incremental area of the same representation, each incremental area of each separate pictorial representation being spaced by the border and incremental areas of different representations from the nearest adjacent incremental area of the same representation by an angle of arc measured from a remote viewing point which is less than the resolving power of the human eye, and a mask adjustably positioned substantially adjacent to and between the display panel and a point of observation, said mask having therein a multiplicity of apertures of a number corresponding to the number of incremental areas into which each pictorial representation is formed, the apertures of the mask being arranged similarly to the arrangement of the incremental areas of each representation so that when the mask apertures are imaged on the panel viewing is restricted to the revealed incremental areas of a single representation.

7. A composite display panel to form a plurality of separate pictorial representations each comprising a multiplicity of sets of segregated and similarly positioned like-size incremental areas of the plurality of representations, the incremental areas of each representation being spaced from each other by orderly repeating intervening incremental areas of other representations, and an opaque border region around each incremental area to segregate it from a similarly positioned incremental area of a different representation and to isolate it from the nearest adjacent incremental area of the same representation, each incremental area of each separate pictorial representation being spaced by the border and incremental areas of different representations from the nearest adjacent incremental area of the same representation by an angle of arc measured from a remote viewing point which is less than the resolving power of the human eye, a mask adjustably positioned substantially adjacent to and between the display panel and a point of observation, said mask having therein a multiplicity of apertures of a number corresponding to the number of incremental areas into which each pictorial representation is formed, the apertures of the mask being arranged similarly to the arrangement of the incremental areas of each representation so that when the mask apertures are imaged on the panel viewing is restricted to the revealed incremental areas of a single representation, means to move the panel and mask relative to each other to reveal thereby simultaneously and in an orderly sequence different multiplicities of incremental areas related to different selected pictorial representations.

8. A display apparatus for exhibiting pictorial representations comprising a panel having a plurality of pictorial representations formed therein, each pictorial representation being divided into a multiplicity of segregated and similarly positioned like size component parts each indicative of only a minute portion of the said representation, the component parts of each representation being uniformly separated from like area component parts of other pictorial representations of the plurality, the component parts of each of the plurality of representations being intermingled and repeating in an orderly cycle, and a border member of substantially constant and uniform light transmitting characteristic around each component part of each minute portion of each pictorial reprseentation to isolate it from adjacent component parts of any pictorial representation.

9. The apparatus claimed in claim 8 wherein each component part of each minute portion of the pictorial representation is substantially of dot formation.

10. The apparatus claimed in claim 8 wherein each component part of each minute portion of each pictorial representation is substantially of rectangular shape.

11. The display panel apparatus claimed in claim 8 wherein the width of the border regions between adjacent incremental areas of the representations which are adjacent thereto is of the order of 1 to 6 with respect to the small dimension of the pictorial part.

12. The apparatus claimed in claim 8 wherein each component part of each minute portion of each pictorial representation is substantially herringbone shape.

13. In combination, a composite display panel having a plurality of pictorial representations comprising a multiplicity of sets of segregated similarly positioned likesize incremental areas of the plurality of said representations, the incremental areas of each representation being spaced from each other by orderly repeating intervening and interspersed incremental areas of other representations, and a border region of a uniform light transmitting characteristic different from the pictorial representations around each incremental area to isolate it from the nearest adjacent incremental area, each incremental area of each separate pictorial representation being spaced from the nearest adjacent incremental area by an angle of arc measured from a remote viewing point which is less than the resolving power of the human eye, a mask adapted for positioning between the panel and the point of observation, said mask having therein a multiplicity of apertures of a number and shape substantially corresponding to the number of incremental areas into which each pictorial representation is formed, the mask apertures being positioned similarly to the segregated incremental areas of the representation so that when superimposed on the panel the apertures are imaged upon the spaced incremental areas of a single representation only, with all incremental areas of other pictorial representations on the panel masked, and means to shift the relative position of the panel and mask with respect to each other to reveal, with shift, simultaneously different multiplicities of incremental areas related to selected different pictoral representations, the movement of the mask with respect to the panel being in a direction transverse to the greatest dimension of the component part.

14. The apparatus claimed in claim 13 wherein the incremental areas are each of rectangular shape and wherein the means to provide the relative shift between the mask and panel comprises means to reciprocate the mask in a direction transverse to the long dimension of the strips.

15. The apparatus claimed in claim 13 wherein the incremental areas are each of substantially rectangular shape and extend diagonally across the panel and comprise, in addition, means to move the mask at an angle of substantially 45° to the long dimension of the rectangular shaped areas.

16. The apparatus claimed in claim 13 wherein each component part of each minute portion of the pictorial representation is substantially of dot formation.

17. The apparatus claimed in claim 16 wherein the relative movement of the mask to the panel is in an orbital direction relative to the incremented areas of the different representations.

18. Exhibiting apparatus comprising, in combination, a display panel and a masking unit therefor, a plurality of pictorial representations formed on the panel, each pictorial representation being divided into a multiplicity of similarly positioned and like size component parts each indicative of only a minute portion of the said representation, the component parts of each representation being uniformly separated from like area component parts of other pictorial representations of the plurality and all component parts being intermingled and repeating in an orderly cycle, a light absorbing border around each component part of each minute portion of each pictorial representation to isolate it from all other parts, the said mask having a plurality of apertures of a number corresponding to the number of component parts into which each pictorial representation is divided, each mask aperture being located in precise symmetry with respect to the pattern of minute component portions of each pictorial representation, the mask apertures being spaced by opaque regions and each aperture being of a size such that when placed in the light path between an observer and the display panel with each aperture aligned with the component part of the pictorial representation related thereto in spaced position that aligned representation only is observable, and means for moving the panel and mask relative to each other to shift the mask apertures to reveal in an orderly sequence component parts of the different pictorial representations of the panel so that from the same panel the plurality of pictorial representations may be selectively viewed with the component parts of each pictorial representation appearing to merge to form a complete observable image of a selected one of the plurality of representations.

19. Exhibiting apparatus comprising, in combination, a display panel, a plurality of pictorial representations formed on the panel, each pictorial representation being divided into a multiplicity of similarly positioned and like size component parts each indicative of only a minute portion of the said representation, the component parts of each representation being uniformly separated from like area component parts of other pictorial representations of the plurality and all component parts being intermingled to repeat in an orderly cycle, a substantially opaque and non-reflecting border around each component part of each minute portion of each pictorial representation to isolate each minute portion from that adjacent to it, a mask having a plurality of apertures of a number corresponding to the number of component parts into which each pictorial representation is divided, each aperture of the mask being located in precise symmetry with respect to the pattern of minute component portions of each pictorial representation, the mask apertures being spaced by opaque regions and each aperture being of a size such that when placed in the light path between an observer and the display panel with each aperture aligned with one of the component parts of the pictorial representation only the component parts of the aligned representation are observable as merged into a single substantially larger area, and means for moving the panel and mask relative to each other to shift the mask apertures to component parts of the different pictorial representations of the panel so that from the same panel the plurality of pictorial representations may be selectively viewed and the component parts of each pictorial representation caused to appear to merge to form a complete observable image of selected ones of the plurality of representations.

20. The apparatus claimed in claim 19 wherein the width of the opaque regions between adjacent minute size incremental areas of the representations which is adjacent thereto is of the order of 1 to 6 with respect to the small dimension of the pictorial incremental area.

21. Exhibiting apparatus comprising, in combination, a display panel, a plurality of pictorial representations formed on the panel, each pictorial representation being divided into a multiplicity of rectangular strips each having one dimension correspond to one dimension of each representation and the other dimension representing a minute portion only of the second dimension of the representation, the individual strips of all of the plurality of representations being parallelly positioned and strips of each separate representation uniformly separated from similar region strips of other pictorial representations of the plurality, all of the strips of each representation repeating in an orderly cycle, a substantially opaque and non-reflecting border around the long dimension edges of each rectangular strip to isolate each minute portion of each pictorial representation strip from each adjacent strip representing a different pictorial representation, a mask having a plurality of apertures of a number corresponding to the number of strips into which each pictorial representation is divided with each mask aperture being located in precise symmetry with respect to the strip pattern of each pictorial representation, each mask aperture being spaced by an opaque region of a width such that when the mask is placed between an observer and the display panel with the mask apertures aligned with the strips of one of the pictorial representations that representation only is observable through the mask, and means for moving the panel and mask relative to each other and transversely to the long dimension of each strip to shift the mask apertures to selected strips representing a particular selected pictorial representation on the panel so that from the same panel the plurality of pictorial representations may be selectively and individually viewed and the component parts of each pictorial representation caused to appear to merge to form a complete observable image of a selected one of the plurality of pictorial representations.

22. The apparatus claimed in claim 21 wherein the means to provide the relative shift between the mask and panel comprises means to reciprocate the mask in a direction transverse and normal to the long dimension of the strips.

23. A display panel having a plurality of images thereon, the images being arranged in sections in an identical manner, adjacent sections of each image being spaced apart in a defined pattern with one section from each of the other images in each space therebetween, the image sections on the panel being separated by a zone of constant light transmitting characteristic different from the image sections.

24. A display panel having a plurality of various images arranged in sections thereon and adapted to be viewed through a mask having apertures corresponding substantially to the sections of one image, the mask having a plurality of defined positions relative to the panel and displaying all the sections of a complete image through the apertures in each defined position, the image sections on the panel being separated by a zone of constant light transmitting characteristic different from the image sections.

References Cited in the file of this patent

UNITED STATES PATENTS

| | | |
|---|---|---|
| Re. 13,109 | Spiegel | May 3, 1910 |
| 911,561 | Spiegel | Feb. 2, 1909 |
| 957,120 | Spiegel | May 3, 1910 |
| 1,460,674 | Hutchings | July 3, 1923 |
| 1,636,415 | Greenwalt | July 19, 1927 |
| 2,599,673 | Trumbull et al. | June 10, 1952 |
| 2,832,611 | Prosser | Apr. 29, 1958 |

FOREIGN PATENTS

| | | |
|---|---|---|
| 385,617 | Great Britain | Jan. 17, 1908 |